United States Patent

Roza

[15] 3,673,077
[45] June 27, 1972

[54] PROCESS FOR PRODUCING ELECTRODE BINDER PITCH AND CARBON BLACK FEEDSTOCK

[72] Inventor: Abraham Gerrit Alexander Roza, Amsterdam, Netherlands

[73] Assignee: Shell Oil Company, New York, N.Y.

[22] Filed: Sept. 29, 1969

[21] Appl. No.: 862,025

[30] Foreign Application Priority Data

Oct. 3, 1968 Great Britain ................... 46,915/68

[52] U.S. Cl. ............................. 208/76, 208/40, 208/67, 208/71, 208/93
[51] Int. Cl. .............. C10c 3/04, C10g 37/04, C10g 37/08
[58] Field of Search ................... 208/71, 76, 40, 131

[56] References Cited

UNITED STATES PATENTS

| | | | |
|---|---|---|---|
| 2,752,290 | 6/1956 | Beattie | 208/40 |
| 2,992,181 | 7/1961 | Renner | 208/22 |
| 3,412,009 | 11/1968 | Smith et al. | 208/72 |

Primary Examiner—Delbert E. Gantz
Assistant Examiner—G. E. Schmitkons
Attorney—Harold L. Denkler and Glen R. Grunewald

[57] ABSTRACT

There is disclosed a process for converting the residue portion of a cracked petroleum product into electrode binder pitch and carbon black feedstock, both more valuable products, by heat soaking the residue to produce electrode binder pitch and a middle distillate, and blending the middle distillate with some of the electrode binder pitch to produce a carbon black feedstock.

13 Claims, No Drawings

3,673,077

PROCESS FOR PRODUCING ELECTRODE BINDER PITCH AND CARBON BLACK FEEDSTOCK

BACKGROUND

The starting material for the preparation of carbon black, the so-called carbon black feedstock, hereinafter CBF, consists of a high boiling material with a high aromaticity. This high aromaticity should not be due substantially to the presence of a high percentage of residual material, because it is often very difficult to prepare carbon black of the requisite structure from residual material. The aromaticity of CBF is generally expressed in the Bureau of Mines Correlation Index (CI), represented by the formula $$CI = 48,640/K + 473.7\ G - 456.8$$

where $K$ = temperature in °K at which 50 percent v distillate has been obtained during a distillation of the material according to ASTM D 158, and $G$ = density of the material at 60° F. relative to water of 60° F.

To be suitable for use as CBF, the material should preferably have a CI of at least 120. The amount of coking residue of CBF, expressed in the Conradson Carbon Residue (CCR), should preferably be below 12 percent w. The material should have a flash point (determined according to the Pensky Martin closed cup method) of at least 65° C. A sufficiently high flash point is required to obviate difficulties in the processing of the material. The requirement concerning flash point is easily satisfied if a material with an initial boiling point of 200° C or higher is chosen as CBF. It should be noted that the requirements of the various carbon-black manufacturers with regard to the CBF vary rather widely. CBF is frequently evaluated on the basis of performance so that in some cases products which do not fully come up to the above-mentioned requirements may still be acceptable for certain carbon-black manufacturers. Products which completely satisfy the above-mentioned requirements may be expected to be acceptable in all respects for carbon-black preparation. Suitable base materials for the preparation of carbon black on the basis of petroleum are bottom products obtained by cracking of hydrocarbon oils.

Electrode binder pitch, hereinafter EBP, is used as a binder for carbon electrodes which find application in the chemical and metallurgical industries, such as the preparation of aluminum from $Al_2O_3$. Large quantities of electrode are required especially for this application, because the carbon electrode combines with the oxygen of the $Al_2O_3$ and is consumed during the electrolysis. Carbon electrodes are baked at an elevated temperature from a mixture of about 70–90 percent w coke and about 10–30 percent w pitch. The pitch should meet a number of requirements in order to be suitable for this purpose. The pitch must have a high coking residue (CCR at least 40 percent w). The coke formed from the pitch must have a good binding power towards the coke that was already present in the mixture before baking. To have such properties the pitch should have a high content of high-molecular weight aromatic compounds which are insoluble in toluene, but soluble in quinoline, the said content being preferably at least 15 percent w. As the pitch has to be mixed in the liquid state with the coke before baking, there is a strong preference for pitches whose softening point is below 120° C. Only pitches with a high aromaticity have the above-mentioned properties.

As it has been found in the preparation of aluminum that inorganic constituents, in particular iron and vanadium compounds, considerably increase the electrode consumption per ton of aluminum produced, the ash content of a good EBP that is suitable for use in the manufacture of electrodes for the preparation of aluminum should be less than 0.1 percent w.

The starting material for the preparation of EBP is coal tar in many cases. It is also possible to prepare suitable EBP from petroleum, namely from bottom products or residues obtained by cracking of hydrocarbon oils. These bottom products generally contain too few components that are insoluble in toluene to be suitable per se as EBP. In order to render the bottom products suitable for this purpose, the content of components that are insoluble in toluene should be increased. This can be achieved by subjecting the bottom products to a heat soaking. For the preparation of an EBP with the desired softening point the bottom products should in general be distilled after the heat soaking.

From the above it will be clear that bottom products obtained by cracking of hydrocarbon oils may be used both as CBF and for the preparation of EBP. If these bottom products are used for the preparation of EBP, great quantities of middle distillate are obtained in addition to EBP. Middle distillate is a hydrocarbon fraction boiling higher than gasoline, but still not the highest boiling of the vaporizable hydrocarbon materials. Middle distillate usually boils between about 200° C. and about 400° C., but may have a substantially higher initial boiling point, e.g., 270° C. This distillate can in principle be used only as fuel oil and has considerably less value than EBP or CBF. It does not therefore appear economically justifiable to subject a base material that is per se suitable as CBF to an additional heat soaking which yields not only a certain quantity of valuable EBP but also a large amount of low-value middle distillate.

THE INVENTION

It has now been found that it is possible to prepare both CBF and EBP from the above-mentioned bottom products without obtaining low-value middle distillate. To this end, a hydrocarbon oil which has been subjected to cracking is used as starting material. In accordance with this invention, the bottoms, or the heaviest part of the cracked product, is subjected to a heat soaking to increase the proportion of components that are insoluble in toluene. A middle distillate and an EBP with the desired softening point are separated from the products obtained by heat soaking. The middle distillate so obtained is subsequently blended with a small quantity of the EBP prepared in order to enhance the aromaticity of the distillate thereby preparing a product that is suitable as CBF. If the feed for the heat soaker has a relatively high initial boiling point, middle distillate can be separated from the remaining part of the cracked product, and used for the preparation of CBF. In that case the cracked product middle distillate is blended with the middle distillate obtained from the heat soaker and with a small quantity of the EBP prepared.

The invention therefore relates to a process for the preparation of both EBP and CBF by cracking a hydrocarbon oil as hereinafter defined and separating a residual fraction from the cracked products, subsequently exposing said residual fraction to a heat soaking as hereinafter defined and separating an EBP from the heat soaking products, and finally blending a part of the resultant electrode binder pitch with at least a part of a middle distillate separated from the heat soaking products to produce a CBF.

Whenever cracking or heat soaking are referred to in the present application, these terms should be understood to mean the following:

Cracking is the exposure of a feed to a high temperature for a relatively short time to convert a substantial part of the feed into products boiling below the initial boiling point of the feed.

Heat soaking is the exposure, in substantially liquid state, of a bottom product, from a cracking plant to an elevated temperature for a relatively long time to increase the aromaticity and the content of compounds that are insoluble in toluene, and to stabilize the bottom product.

Hydrocarbon oils suitable for use as starting materials for the process of the invention are in particular hydrocarbon oils with a final boiling point below 600° C. derived from petroleum. Examples of very suitable hydrocarbon oils of this type are petroleum distillates such as naphthas and gas oils which are obtained by atmospheric distillation of crude oils and the heavy distillates obtained by distillation under reduced pressure of residues resulting from the atmospheric distillation of crude oils. Also very suitable are cycle oils obtained by the catalytic cracking of petroleum distillates.

Cracking processes yielding bottom products that are very suitable as feedstock for the preparation of both EBP and CBF according to the invention include, among others, the following thermal cracking processes which are carried out at temperatures above 400° C.

a. Thermal cracking at a temperature above 750° C. of either petroleum distillates boiling between 50° and 200° C. or petroleum distillates boiling between 170° and 370° C. to prepare gases that may serve as base material for the petrochemical industry.

b. Thermal cracking of cycle oil, possibly together with slurry oil, obtained in the preparation of gasoline by catalytic cracking of petroleum distillates boiling between 170° and 500° C.

c. Thermal cracking of heavy distillates boiling between 350° and 500° C., which are obtained in the distillation under reduced pressure of residues originating from atmospheric distillation of crude oil.

The cracking processes mentioned under (b) and (c) are as a rule carried out at temperatures between 450° and 550° C.

The initial boiling point of the residual fraction of the cracked products that is suitable for use as feedstock for the heat soaker is determined by the following considerations:

a It is often impossible to separate cracked products boiling below 300°–350° C. as liquid bottom product, in particular in the case of cracking processes operated above 750° C., where the feed is cracked in the gaseous state under elevated pressure.

b. If a larger proportion of the cracked products is subjected to the heat soaking, the yield of EBP relative to the total quantity of cracked products obtained will increase because heavier molecules are formed through polymerization of relatively light material during the heat soaking. From cracked products with a boiling point below 250° C., however, only very little heavy material that may form a suitable component of EBP will be produced during the heat soaking. Cracked products with boiling points below 150° C. will make hardly any contribution to the formation of CBF or EBP during the heat soaking. If all cracked products with boiling points above 150° C. are subjected to the heat soaking, the yield of CBF and EBP relative to the total quantity of cracked products obtained will be a maximum. However, substantially the same yield can be obtained if the heat soaking is applied only to cracked products boiling above 250° C.

c. As the initial boiling point of the heat-soaker feedstock is lower, a higher pressure will have to be applied during the heat soaking to prevent the loss of the light material. The operation at higher pressure involves higher running costs of the process.

d. If the heat-soaker feedstock is too heavy and viscous, there is the risk of coke deposition during heat soaking and clogging may occur. It is therefore advisable to choose the initial boiling point of the heat-soaker feed to be not higher than 400° C.

These considerations lead to the choice of the heaviest part of cracked products with an initial boiling point between 150° and 400° C., and preferably between 250° and 400° C., as feedstock for heat soaking, in order to secure the highest possible yield of CBF and EBF without difficulties in the operation of the process.

When heat soaking is carried out at lower temperatures, a longer time will be required. For instance, heat soaking at 450° C. for 15 minutes produces a final liquid product with substantially the same properties as one obtained by heat soaking at 350° C. for 25 hours. If heat soaking is carried out at temperatures below 350° C., extremely long times are necessary. At higher heat soaking temperature the risk of coke deposition in the heat soaker increases and higher pressure is required to prevent the loss of some of the feedstock during heat soaking.

In view of the above-mentioned considerations, the heat soaking can be conveniently carried out at a temperature between 350° and 500° C., preferably between 400° and 450° C., for at most 2 hours. If the heat soaking is carried out under dehydrogenating conditions, which can be brought about by passing air through the liquid during heat soaking, a considerably shorter residence time is required. If air is passed through the liquid during the heat-soaking process, temperatures below 400° C. may be used without long residence times. When using air, the heat soaking is best carried out at atmospheric pressure and to obviate formation of great quantities of distillate during heat soaking, a bottom product with an initial boiling point above 350° C. should be used as heat-soaker feedstock.

During heat soaking gases and distillate boiling below the initial boiling point of the heat-soaker feed are formed, and these tend to escape. The distillate will remain wholly or in part in the heat soaker depending on the pressure applied, but the material in the heat soaker at the conclusion of the heat soaking usually must be distilled to prepare an EBP with the desired softening point. If the heat soaking is conducted with air, it may be attractive to choose the operating conditions such that an EBP with the desired softening point is retained in the heat soaker, by allowing a certain quantity of distillate to escape from the heat soaker with the gases vented from the heat soaker.

In general, the distillation of the products obtained by heat soaking is conducted to yield both an EBP and a middle distillate. The middle distillates obtained from this process may be used wholly or in part for the preparation of CBF.

If the heat soaking is conducted with air in such a fashion that an EBP with the desired softening point remains behind in the heat soaker, it may be necessary to blend a part of this EBP exclusively with a middle distillate obtained from the cracked products rather than the middle distillate produced by heat soaking.

The flash point of the CBF should preferably be not lower than 65° C., and accordingly, the middle distillate used for the preparation of CBF should likewise have a flash point not lower than 65° C. Middle distillates with an initial boiling point of 200° C. or higher easily satisfy this requirement.

If the residual fraction that is separated from the cracked products and subjected to heat soaking has an initial boiling point well above 200° C., it is advisable to separate a middle distillate from the cracked products and use it as well as the middle distillate produced in heat soaking for the preparation of CBF, in order to ensure an adequate yield both of EBP and CBF.

The invention may be better understood with the aid of the following examples.

EXAMPLE I

A cycle oil obtained by the catalytic cracking at 460° C of a hydrocarbon oil boiling between 340° and 450° C. was thermally cracked at 492° C. The products obtained by this thermal cracking process E were separated by distillation into a light distillate fraction and a heavy residual fraction A. The cutting point between the two fractions was 250° C. Fraction A was subjected to heat soaking at 400° C. at a pressure of 5 atm for 15 hours, which caused 2.6 percent by weight of gas to escape. The material present in the heat soaker at the conclusion of the heat soaking was split by distillation into 7.2 percent by weight of a light distillate fraction, 59.2 percent by weight of a middle distillate fraction D and 31.0 percent by weight of EBP. The cutting point between the two distillate fractions was 200° C. The EBP so obtained had the following properties:

| | |
|---|---|
| Softening point Ring and Ball | 98°C |
| Content of components which are insoluble in toluene, but soluble in quinoline | 21.5%w |
| CCR | 49.0%w |

Fraction D was blended with 8.0% by weight of EBP to obtain a CBF with the following properties:

| | |
|---|---|
| CI: | 128 |
| CCR: | 8.2%w |

Flash Point: 82°C

In this way the following products were obtained from the cracked products boiling above 250° C:
2.6 percent w gas
7.2 percent w light distillate
67.2 percent w CBF
23.0 percent w EBP

EXAMPLE II

The cracked products E mentioned in Example I were separated by distillation into three fractions, namely a light distillate fraction, a middle distillate fraction B and a heavy residual fraction C. The cutting point between the two distillate fractions was 250° C. and that between fractions B and C 350° C. The quantities of fractions B and C amounted to 33.8 and 66.2 percent by weight. Fraction C was subjected to heat soaking at 450° C. and 15 atm pressure for 1½ hours which caused 2.1 percent by weight of gas to escape. The material present in the heat soaker at the conclusion of the heat soaking was split by distillation into 3.4 percent by weight of a light distillate fraction, 31.5 percent by weight of a middle distillate fraction D and 29.2% by weight of EBP. The cutting point between the two distillate fractions was 200° C. The EBP so obtained had the following properties:

| | |
|---|---|
| Softening point Ring and Ball | 102°C |
| Content of components which are insoluble in toluene, but soluble in quinoline | 23.2%w |
| CCR | 52.0%w |

Fraction B was blended with fraction D and with 10.9 percent by weight of EBP to obtain a CBF with the following properties:

| | |
|---|---|
| CI: | 121 |
| CCR: | 11.0%w |
| Flash point: | 102°C |

In this way the following products were obtained from the cracked products boiling above 250° C:
2.1 percent w gas
3.4 percent w light distillate
76.2 percent w CBF
18.3 percent w EBP

EXAMPLE III

The cracked products E mentioned in Example I were separated by distillation into a light distillate fraction and a heavy residual fraction A. The cutting point between the two fractions was 350° C. Fraction A was subjected to heat soaking at 450° C. and 15 atm pressure for 1½ hours which caused 3.2 percent by weight of gas to escape. The material present in the heat soaker at the conclusion of the heat soaking was split by distillation into 5.1 percent by weight of a light distillate fraction, 47.6 percent by weight of a middle distillate fraction D and 44.1 percent by weight of EBP. The cutting point between the two distillate fractions was 200° C. The EBP so obtained had the following properties:

| | |
|---|---|
| Softening point Ring and Ball | 102°C |
| Content of components which are insoluble in toluene, but soluble in quinoline | 23.2%w |
| CCR | 52.0%w |

Fraction D was blended with 5.6 parts by weight of EBP to obtain a CBF with the following properties:

| | |
|---|---|
| CI: | 125 |
| CCR: | 8.5%w |
| Flash point: | 98°C |

In this way the following products were obtained from the cracked products boiling above 350° C:
3.2 percent w gas
5.1 percent w light distillate
53.2 percent w CBF
38.5 percent w EBP As fraction A accounts for 66.2 percent w of the cracked products boiling above 250° C., the yields relative to the cracked products boiling above 250° C. are as follows:
2.1 percent w gas
3.4 percent w light distillate
35.2 percent w CBF
25.5 percent w EBP

EXAMPLE IV

The cracked products E mentioned in Example I were split by distillation into a light distillate fraction, a middle distillate fraction B and a heavy residual fraction C. The cutting point between the two distillate fractions was 250° C. and that between fractions B and C was 375° C. The quantities of fractions B and C amounted to 39.2 and 60.8 percent by weight, respectively. Fraction C was subjected to heat soaking at 375° C. and atmospheric pressure for 2 hours and 20 minutes, while 95 liters of air per kg feed was passed through it. During this heat soaking 12.4 percent by weight of gaseous products and distillate escaped from the heat soaker. The part of this gaseous product that was liquid at room temperature was added to the material present in the heat soaker at the conclusion of the heat soaking, and the resultant product was subsequently split by distillation into 2.2 percent by weight of a light distillate fraction, 24.2 percent by weight of a middle distillate fraction D and 33.5 percent by weight of EBP. The cutting point between the two distillate fractions was 200° C. The EBP so obtained had the following properties:

| | |
|---|---|
| Softening point Ring and Ball | 94°C |
| Content of components which are insoluble in toluene, but soluble in quinoline | 23.9%w |
| CCR | 50.5%w |

Fraction B was blended with fraction D and with 12.6 percent by weight of EBP to obtain a CBF with the following properties:

| | |
|---|---|
| CI: | 126 |
| CCR: | 8.6%w |
| Flash point: | 88°C. |

In this way the following products were obtained from the cracked products boiling above 250° C.:
1.0 percent w gas
2.2 percent w light distillate
75.9 percent w CBF
20.9 percent w EBP Comparison of the results reported in Examples I and II shows that heat soaking of all cracked products boiling above 250° C. yields little more EBP than heat soaking of the cracked products boiling above 350° C. (31.0 and 29.2% by weight, respectively, in both cases on the basis of cracked product boiling above 259° C.).

Comparison of the results reported in Examples II and III shows that if the fraction with a boiling range between 250° and 350° C. from the cracked product is not used for the preparation of CBF, a higher yield of EBP is obtained, whereas the yield of CBF drops to an appreciably lower level.

Comparison of the results reported in Examples I and IV shows that by passing air through the liquid during heat soaking, substantially the same effect can be reached in a considerably shorter time.

EXAMPLE V

A hydrocarbon oil boiling between 65° and 185° C. was thermally cracked at a temperature of 800° C. with the aid of superheated steam. From the products so obtained a heavy residual fraction A with an initial boiling point of 300° C. was separated. Fraction A was subjected to heat soaking at 370° C. and a pressure of 3 atm for 26 hours. This caused 2.8 percent by weight of gas to escape. The material present in the heat soaker at the conclusion of the heat soaking was split by distillation into 3.2 percent by weight of a light distillate fraction, 44.0 percent by weight of a middle distillate fraction D and 50.0 percent by weight of EBP. The cutting point between the two distillate fractions was 200° C. The EBP had the following properties:

| | |
|---|---|
| Softening point Ring and Ball | 98°C |
| Content of Components which are insoluble in toluene, but soluble in quinoline | 23.5%w |
| CCR | 51.0%w |

Fraction D was blended with 11.0 percent by weight of EBP to obtain a CBF with the following properties:

| | |
|---|---|
| CI: | 128 |
| CCR: | 10.9%w |
| Flash point: | 95°C |

In this way the following products were obtained from the cracked products boiling above 300° C.
2.8 percent w gas
3.2 percent w light distillate
55.0 percent w CBF
39.0 percent w EBP

EXAMPLE VI

A hydrocarbon oil boiling between 250° and 350° C. was thermally cracked at a temperature of 780° C. with the aid of superheated steam. From the products so obtained (F) a heavy residual fraction A with an initial boiling point above 330° C. was separated. Fraction A was subjected to heat soaking at 440° C. and a pressure of 15 atm for 24 minutes. This caused 6.2 percent by weight of gas to escape. The material present in the heat soaker at the conclusion of the heat soaking was split by distillation into 3.6 percent by weight of a light distillate fraction, 28.3 percent by weight of a middle distillate fraction D and 61.9 percent by weight of EBP. The cutting point between the two distillate fractions was 200° C. The EBP so obtained had the following properties:

| | |
|---|---|
| Softening point Ring and Ball | 92°C |
| Content of components which are insoluble in toluene, but soluble in quinoline | 20.2%w |
| CCR | 49.0%w |

Fraction D was blended with 6.0 percent by weight of EBP to obtain a CBF with the following properties:

| | |
|---|---|
| CI: | 125 |
| CCR: | 9.8%w |
| Flash point: | 90°C |

In this way the following products were obtained from the cracked products boiling above 330° C.:
6.2 percent w gas
3.6 percent w light distillate
34.3 percent w CBF
55.9 percent w EBP

EXAMPLE VII

From the cracked product F mentioned in Example VI a heavy residual fraction with an initial boiling point of 330° C. was separated. This fraction was split by distillation into a middle distillate fraction B and a heavy residual fraction C. The cutting point between the two fractions was 400° C. The quantities of fractions B and C amounted to 32.3 and 67.7 percent by weight, respectively. Fraction C was subjected to heat soaking at 375° C. and atmospheric pressure for 3 hours, while 90 liters air per kg feed was passed through it. During this heat soaking 43. percent by weight of gaseous products and distillate escaped from the heat soaker. The material present in the heat soaker at the conclusion of the heat soaking was an EBP with the following properties:

| | |
|---|---|
| Softening point Ring and Ball | 100°C |
| Content of components which are insoluble in toluene, but soluble in quinoline | 22.2%w |
| CCR | 51.2%w |

Fraction B was blended with 7.9 percent by weight of EBP to obtain a CBF with the following properties:

| | |
|---|---|
| CI: | 129 |
| CCR: | 11.5%w |
| Flash point: | 187°C |

In this way the following products were obtained from the cracked products boiling above 330° C:
4.3 percent w gas and distillate
40.2 percent w CBF
55.5 percent w EBP

I claim:
1. A process for the preparation of electrode binder pitch and carbon black feedstock, which comprises thermally cracking at a temperature above 400° C. a petroleum-derived hydrocarbon oil having a final boiling point below 600° C., separating from the resultant cracked products a residual fraction having an initial boiling point between 150° and 400° C., heat soaking said residual fraction at a temperature between 350° and 500° C., separating an electrode binder pitch from the heat soaking products, and blending a part of said electrode binder pitch with middle distillate separated from said cracked products or from said heat soaking products to form a carbon black feedstock.

2. The process of claim 1 wherein the residual fraction separated from the cracked product has an initial boiling point between 250° and 400° C.

3. The process of claim 1 wherein the heat soaking is carried out under a pressure above atmospheric at a temperature between 400° and 450° C. for 2 hours at most.

4. The process of claim 1 wherein the heat soaking is carried out at a temperature between 350° and 400° C., while air is passed through the liquid.

5. The process of claim 4 wherein the heat soaking is carried out under atmospheric pressure and enough air is passed through the liquid to remove light material so that an electrode binder pitch with the desired softening point remains behind in the heat soaker as a residue.

6. The process of claim 5 wherein the heat soaking is applied to a residual fraction with an initial boiling point above 350° C.

7. The process of claim 1 wherein the cracking is carried out at a temperature between 450° and 550° C.

8. The process of claim 1 wherein cracking is carried out at a temperature above 750° C.

9. The process of claim 1 wherein a catalytic cracker cycle oil is cracked.

10. The process of claim 1 wherein a petroleum distillate boiling between 350° and 500° C. is cracked.

11. The process of claim 1 wherein a petroleum distillate boiling between 170° and 370° C. is cracked.

12. The process of claim 1 wherein a petroleum distillate boiling between 50° and 200° C. is cracked.

13. The process of claim 1 wherein the middle distillate used for the preparation of carbon black feedstock has a flash point of at least 65° C.

* * * * *